June 8, 1948. A. SIMMON 2,443,058
PHOTOELECTRIC EXPOSURE TIME AND CONTRAST PRINT
CONTROL INSTRUMENTS FOR PHOTOGRAPHIC ENLARGERS
Filed April 25, 1947 6 Sheets-Sheet 1

Alfred Simmon
INVENTOR.

BY Walter E. Wollheim

ATTORNEY

June 8, 1948.    A. SIMMON    2,443,058
PHOTOELECTRIC EXPOSURE TIME AND CONTRAST PRINT
CONTROL INSTRUMENTS FOR PHOTOGRAPHIC ENLARGERS
Filed April 25, 1947    6 Sheets-Sheet 2
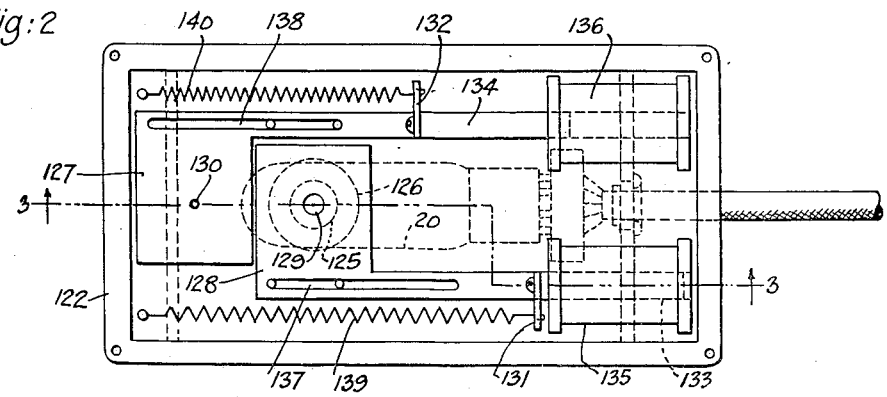
Fig:2
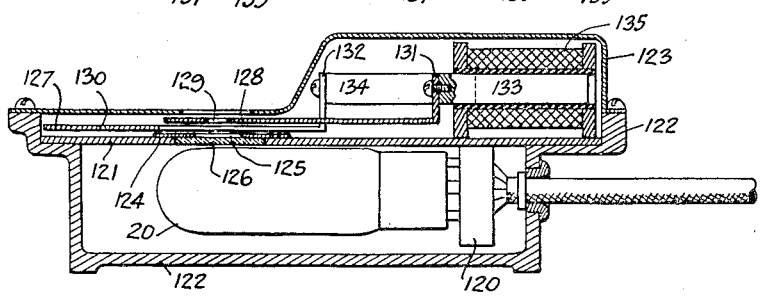
Fig:3
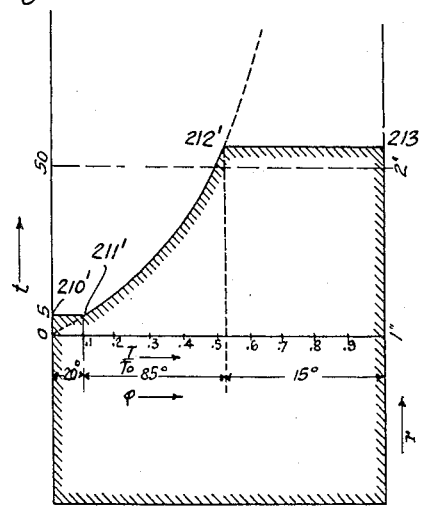
Fig:8
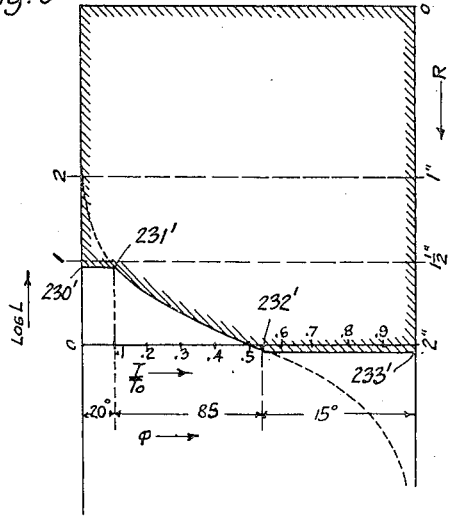
Fig:9
Alfred Simmon
INVENTOR.
BY Walter E. Wollheim
ATTORNEY June 8, 1948.   A. SIMMON   2,443,058
PHOTOELECTRIC EXPOSURE TIME AND CONTRAST PRINT
CONTROL INSTRUMENTS FOR PHOTOGRAPHIC ENLARGERS
Filed April 25, 1947   6 Sheets-Sheet 3
Fig: 4
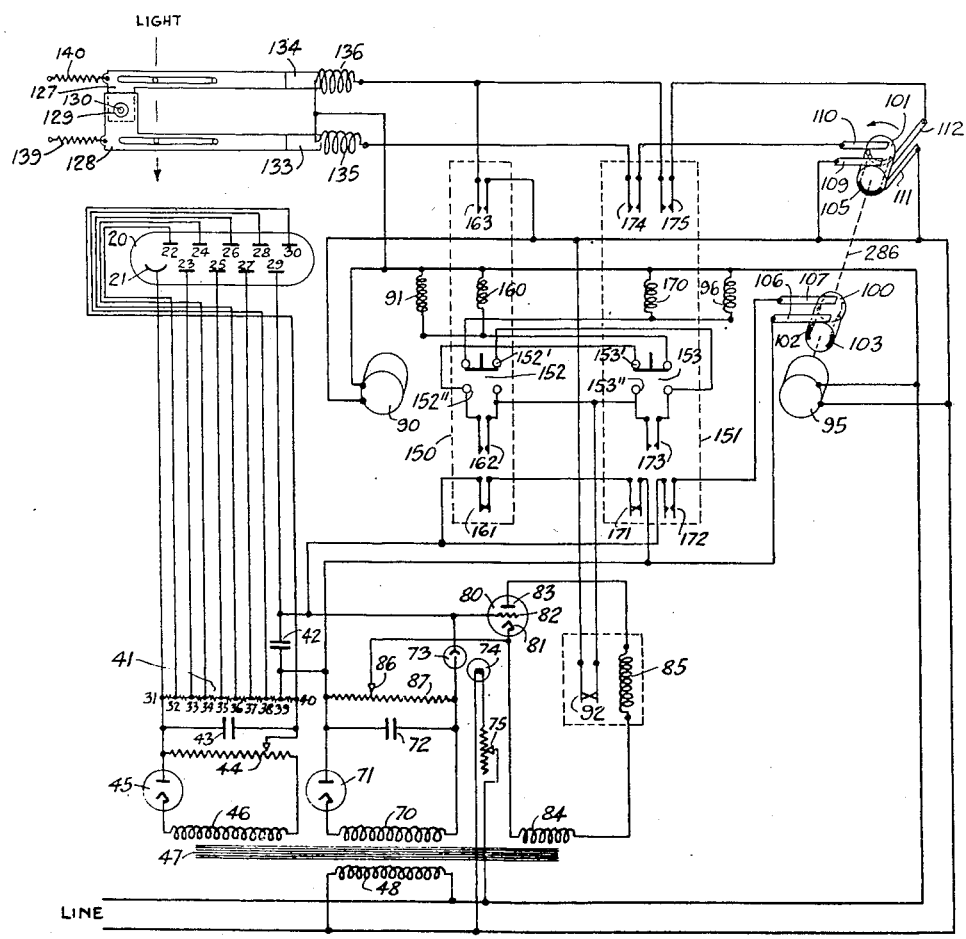
Alfred Simmon
INVENTOR.
BY Walter E. Wollheim
ATTORNEY Alfred Simmon
INVENTOR.
BY Walter E. Wollheim
ATTORNEY

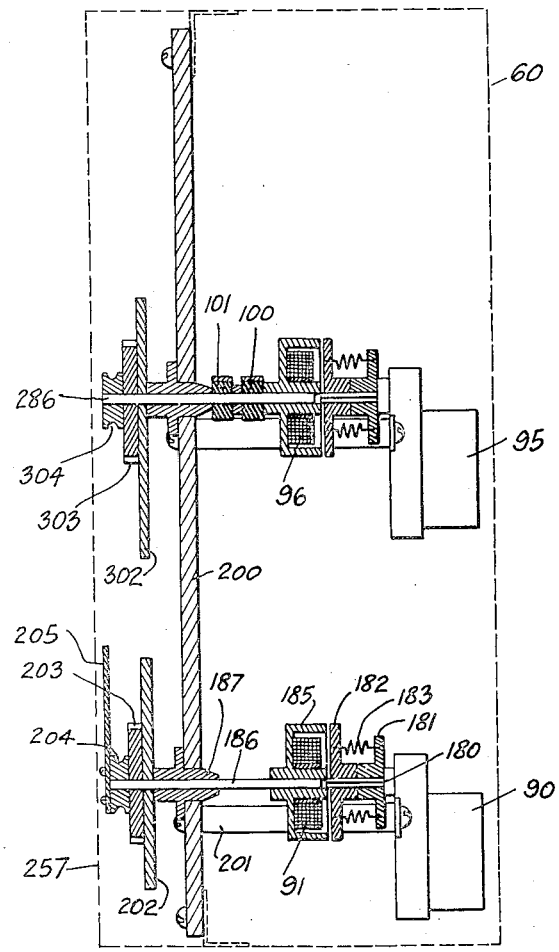

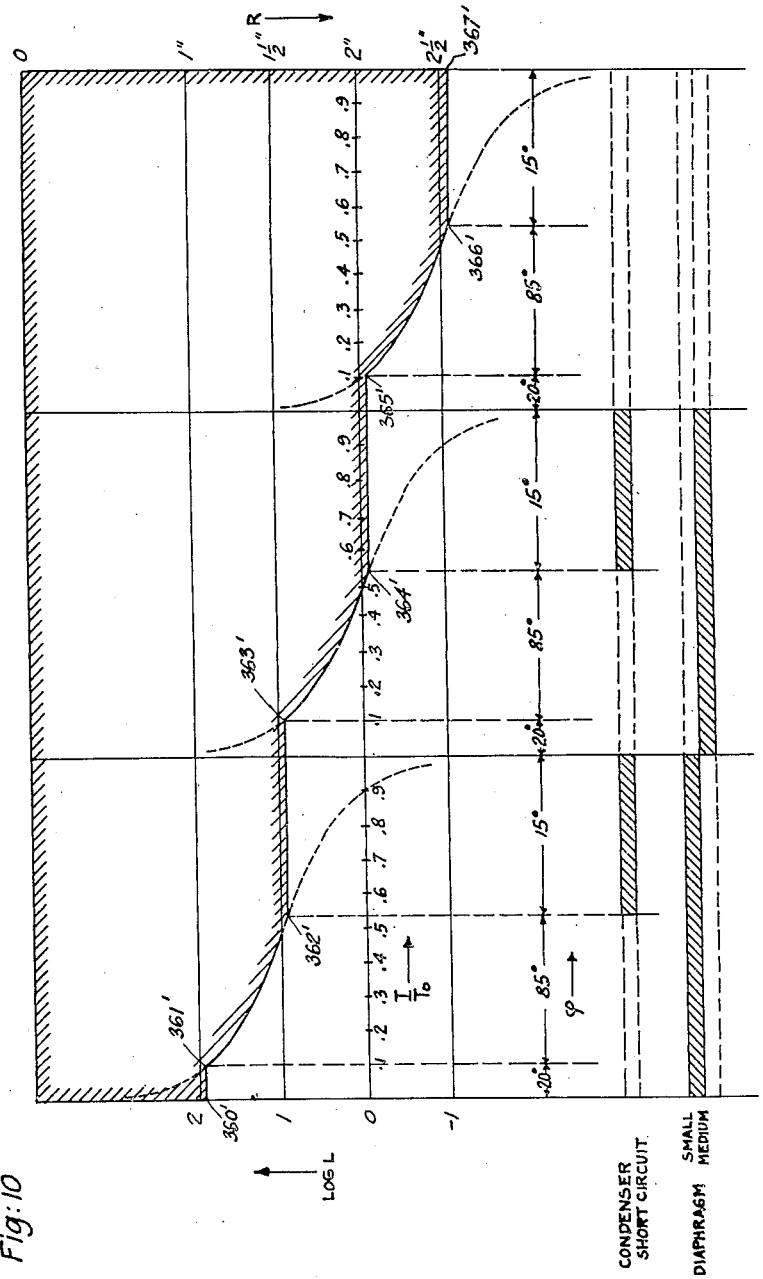
Fig: 10

Patented June 8, 1948

2,443,058

UNITED STATES PATENT OFFICE 2,443,058

PHOTOELECTRIC EXPOSURE TIME AND CONTRAST PRINT CONTROL INSTRUMENT FOR PHOTOGRAPHIC ENLARGERS

Alfred Simmon, Jackson Heights, N. Y., assignor to Simmon Brothers, Inc., Long Island City, N. Y., a corporation of New York Application April 25, 1947, Serial No. 743,949

20 Claims. (Cl. 88—23)

1

The object of this invention is an instrument which indicates the correct exposure time for and the contrast of the enlarged image of a photographic negative as projected by a photographic enlarger upon an easel. This is accomplished by a photoelectric cell placed on this easel or, more specifically, on the points of brightest and darkest illumination thereon. The current passing the photocell in response to the light impinging upon it causes a condenser to change its voltage more or less rapidly, and the time consumed for a voltage change of a predetermined magnitude is measured. The results, respectively, obtained for the brightest and darkest spot on the easel are converted by mechanical means to indications for the exposure time and contrast. For best photographic results, the contrast indication is as necessary as the indication of the correct exposure time since otherwise the contrast range of the photographic negative and of the sensitized paper on which the enlarged image is printed cannot be matched and the indication of contrast is, therefore, instrumental in enabling the operator to select a paper with the proper degree of contrast for a particular print.

A preferred embodiment of my invention is shown in the accompanying drawings in which Fig. 1 shows the general appearance of the device in conjunction with an enlarger of typical design;

Fig. 2 is a plan view of the photocell unit with its cover removed;

Fig. 3 is a sectional view along the plane of line 3—3 in Fig. 2;

Fig. 4 is an electric circuit diagram;

Fig. 7 is a sectional view along the plane of line 7—7 in Fig. 1;

Figs. 8, 9 and 10 are developments of cams associated with the two time-measuring devices for the brightest and darkest spot, respectively. By means of these cams the measured charging times of the condenser are converted into exposure time values and logarithmic light intensity values, respectively.

2

Figure 1:
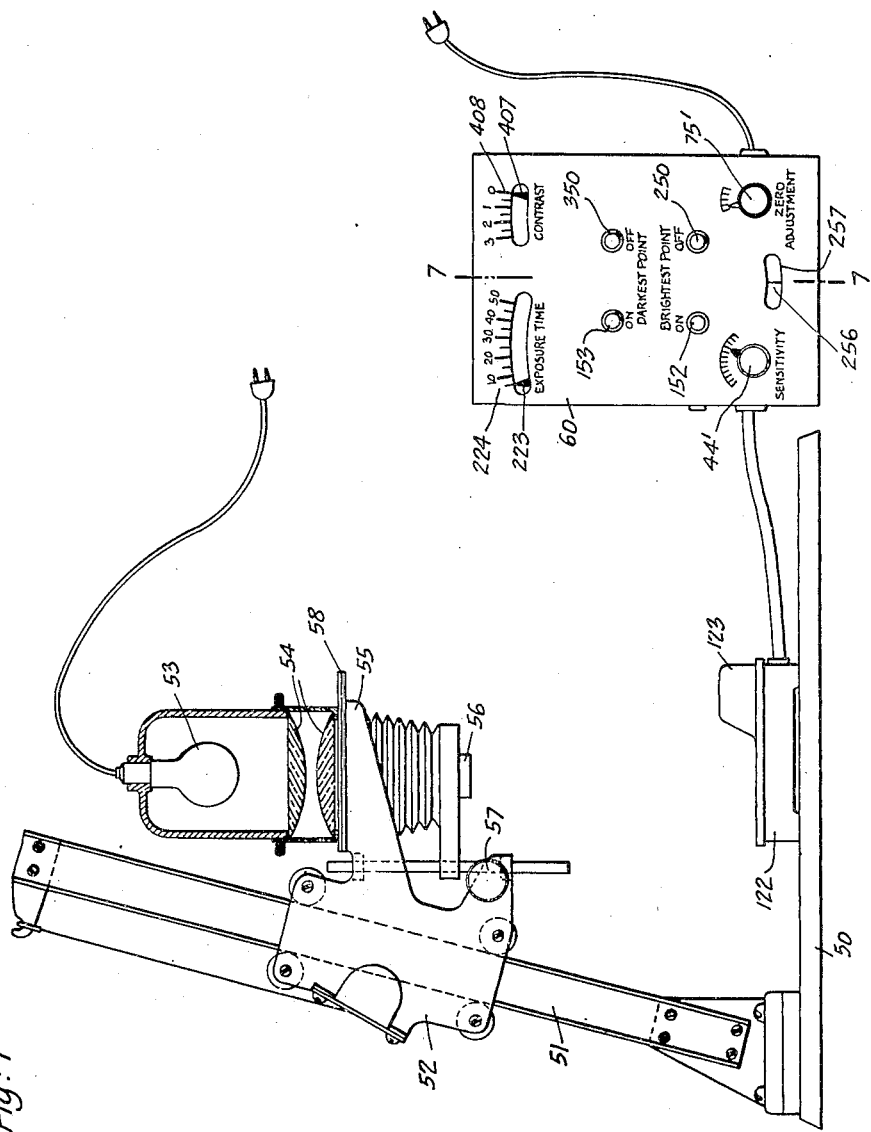

Like characters of reference denote similar parts throughout the several views and the following specification.

BASIC ELECTRICAL DESIGN

While numerous ways are known at the present time to measure light intensities, the choice for the present purpose is limited because the illumination on the easel of the photographic enlarger can, and often does, assume exceedingly low values. For this reason, I use a photoelectric cell of the so called electron multiplier type since complex amplifiers are not necessary with this cell in order to obtain high light sensitivity. The circuit associated with this cell, due to the very low light intensity to be measured, represents an additional problem.

It is known that it is expedient for this purpose to use a condenser in series with the photoelectric cell and to measure the time which it takes to charge or discharge this condenser. While it is theoretically unimportant whether the condenser is charged or discharged during this process, more convenient circuit relations can be obtained by having the condenser charged and this has been shown in the following example. The current that passes the photoelectric cell is substantially proportional to the intensity of the incident light. The charging or discharge time of the condenser, however, is inversely proportional to the current with which it is charged or discharged, and consequently for a circuit of this type charging or discharge times of the condenser for zero light intensity become infinite, and for low light intensities these times become very long. This is objectionable for a number of reasons, so for example, with very long charging or discharging times, incidental small leakages may falsify the result completely. In order to overcome this condition, I provide two parallel but otherwise independent charging circuits for the condenser. The current passing the first circuit is controlled by the photoelectric cell and is at least substantially proportional to the light intensity to be measured. The current passing the second circuit is constant and entirely independent of the light intensity, but may, of course, for convenience, be adjusted to a suitable value where it will be left during the operation of the device. The result of this arrangement is that for zero light values, i. e., absolute darkness, a definite condenser charging time is obtained and that by this expedient convenient and efficient circuit conditions can be easily arranged.

For reasons which will become apparent later, it is important to express the relation between light intensity and condenser charging time for a circuit of the above description. If we call C=condenser capacity
T=condenser charging time
E=condenser voltage
$i_1$=condenser charging current through multiplier tube in $\mu a$. (micro-amps.)
K=multiplier sensitivity in $\mu a$./foot candles
L=light intensity in foot candles (on easel surface)
$i_2$=condenser charging current through auxiliary circuit (in $\mu a$.)

and if we assume that the condenser is charged from a zero voltage, the condenser voltage E can be expressed as follows:

$$E = \frac{T}{C}(i_1 + i_2)$$

$$= \frac{i_2 T}{C}\left(\frac{i_1}{i_2} + 1\right)$$

or $$T = \frac{CE}{i_2}\left(\frac{1}{\frac{i_1}{i_2} + 1}\right)$$

For $i_1=0$, i. e., without any light reaching the photo-electric cell, we shall call the condenser charging time $T_0$. This time becomes $$T^0 = \frac{CE}{i_2}$$

This can be introduced into the formula for T:

$$T = T_0\left(\frac{1}{\frac{i_1}{i_2} + 1}\right)$$

or $$\frac{i_1}{i_2} = \frac{1}{\frac{T}{T_0}} - 1$$

For $i_1$ we can substitute KL, and obtain $$\frac{KL}{i_2} = \frac{1}{\frac{T}{T_0}} - 1$$

$$L = \frac{i_2}{K}\left(\frac{1}{\frac{T}{T_0}} - 1\right)$$

As will be seen later, based on this relationship, cams of very convenient configuration can be designed by means of which exposure times as well as logarithmic light intensity values can be obtained. The convenience with which this can be done is based on the peculiar characteristics of the double condenser charging circuit as expressed by the above formula and this is one of the principal advantages of this arrangement.

BASIC MECHANICAL DESIGN

Reference to Fig. 1 shows that the unit consists, in addition to the enlarger which is merely shown in the interest of completeness, of two principal units, the photo-cell unit and the main unit.

ENLARGER

The enlarger may be of any convenient form or design and merely as a matter of example I have shown a more or less conventional type which may be used for this purpose. This enlarger comprises a base or easel 50 on which a supporting structure 51 is mounted. During the actual printing exposure a sheet of sensitized paper is placed on this easel. The supporting structure may be vertical or preferably slightly inclined as shown. Slidably arranged on this supporting structure is a carriage 52 which supports the projector. The main parts of this projector are a lamp 53, a condenser 54, a film stage 55, a lens 56 and a focusing movement 57. A negative 58 can be placed on the film stage. The distance of the lens 56 from a negative 58 can be adjusted in the usual manner by means of the focusing movement 57 which may, for example, comprise a rack and pinion movement operated by a small handwheel.

PHOTOCELL UNIT

Referring to Figs. 2 and 3, the photoelectric cell 20 is mounted in the conventional tube socket 120 which, in turn, is attached to a plate 121. This plate is mounted in a housing 122, the upper part of which is closed by a cover 123, this cover having being omitted in Fig. 2. Plate 121 supports directly above the photoelectric cell a thin plate 124 with a relatively large aperture 125. Between this aperture and the photoelectric cell there is a small disc of diffusing glass 126. It is the purpose of this diffusing glass to prevent irregularities due to fact that without it the light impinging upon the light sensitive electrode 21 may hit more or less sensitive spots thereon. By interposing this diffusing glass the entire area of this light sensitive electrode will be evenly illuminated.

Mounted on top of plate 121 are two electromagnetically controlled diaphragms 127 and 128. Diaphragm 128 has a medium sized aperture 129 smaller than the aforementioned large aperture 125. In the example described here the area of aperture 129 is 1/10 of the area of aperture 125. The diaphragm 127 has an aperture 130 still smaller and which in the same example has 1/10 of the area of aperture 129 or 1/100 of the area of aperture 125. Each of these diaphragms has the shape shown in Fig. 2, and the two diaphragms are arranged in slightly different planes as shown in Fig. 3. Each of these plates has an upturned lug 131 and 132, respectively, and to each of these upturned lugs there is attached an iron core 133 and 134. Two electromagnetic coils 135 and 136 are provided which, when energized, attract one of these iron cores, respectively. As shown in Fig. 2, coil 135 is represented as energized and has thereby attracted iron core 133 which, in turn, places diaphragm 128 in a position in which its aperture 129 is directly above the photo sensitive electrode 21 of the photoelectric cell. In the circuit diagram, Fig. 4, both coils are shown as deenergized. Each of the aperture plates has a slot 137 and 138, respectively, and each of these slots engages two guide pins shown in Fig. 2. Return springs 139 and 140 are provided which return the diaphragm blades to their original positions as soon as the corresponding coil is deenergized.

MAIN UNIT

The main unit is illustrated in Fig. 1 and comprises a housing 60, preferably of rectangular shape containing all elements other than the photocell unit just described. These elements comprise the mechanisms to be described later by means of which the measured condenser charging times will be converted into exposure time and contrast indications, and also numerous electrical components such as a transformer, rectifying tubes, thyratrons, condensers, relays and others. The precise location of these parts within the housing is of no consequence and they have, therefore, not been shown except on the wiring diagram of Fig. 4. Their electrical function, however, will be fully explained in the following paragraphs.

On the front panel of the main unit the following elements are visible:

1. A handwheel 44' by means of which the sensitivity of the photocell can be adjusted in accordance with the sensitivity of the sensitized paper intended to be used for the print.
2. A handwheel 75' for the zero adjustment by means of which any accidental leakage within the device can be compensated for. This zero adjustment cooperates with a pointer which will appear in a window 257 and which should come to rest on a vertical line 256.
3. A push button 152 by means of which the measuring process for the brightest point on the easel can be initiated.
4. A push button 250 by means of which the device can be reset after this measuring process.
5. A push button 153 by means of which the measuring process for the darkest point on the easel can be initiated.
6. A push button 350 by means of which the device can be reset after this process.
7. A pointer 223 indicating exposure times through a window in the front panel of the main unit on a scale 224.
8. A pointer 407 indicating contrast values through a window in the front panel of the main unit on a scale 408.

ELECTRICAL CIRCUIT

The electrical circuit is shown in Fig. 4. For convenience, it can be sub-divided into six parts as follows:

1. Supply circuit for multiplier tube and first condenser charging circuit.
2. Second condenser charging circuit.
3. Thyratron circuit.
4. First time-measuring unit.
5. Second time-measuring unit.
6. Push button and relay circuit.

These circuits will be described in that sequence.

Supply circuit for multiplier tube and first condenser charging circuit

The multiplier tube 20 comprises a vacuated vessel, a photo emissive cathode 21, and nine electrodes 22 to 30. The cathode 21 and the electrodes 22 to 30 are connected to corresponding taps numbered 31 to 40 of the voltage divider 41. A condenser 42 is inserted into the second last of these connections, i. e., between points 39 and 29. The voltage divider is placed across the terminals of another condenser 43 which, in turn, receives its voltage from a potentiometer 44. This potentiometer is supplied with rectified current by means of a rectifying tube 45 and a transformer which has a secondary coil 46, an iron core 47 and a primary coil 48. The primary coil, in turn, is connected to an alternating current line.

As can be seen, the secondary coil 46 delivers an alternating current of a suitable voltage which, by means of rectifying tube 45, is rectified and impressed upon potentiometer 44. Depending upon the adjustment of this potentiometer, a certain portion of this rectified voltage reaches the condenser 43 which acts as a filter and converts the rectified uni-directional alternating current into direct current with only a small ripple. This D. C. voltage is then by means of voltage divider 41 divided into ten parts. Point 31 assumes the most negative potential and is connected to the photo emissive anode of the multiplier. Going from left to right subsequent points of the voltage divider 41 become increasingly positive and each point has a positive voltage with respect to its left neighbor of approximately 100 volts. The last point 40 which is connected to the last electrode 30 of the multiplier tube is, of course, the most positive of all.

As a consequence of this arrangement, the few electrons which are released by the action of light from the cathode 21 are attracted to the next electrode 22 where they strike with sufficient velocity to release a number of secondary electrons. The secondary electrons are, in turn, attracted by the next electrode 23 where they release tertiary electrons and this process is repeated at each subsequent electrode. The number of the secondary electrons released at electrode 22 is larger than the number of primary electrons causing their release, and again the number of tertiary electrons released at 23 is larger than the number of secondary electrons, and the ability of the tube to "multiply" electrons is based on this fact. The current circulating in the last loop, i. e., between points 39 and 29 and between points 40 and 30 which charges condenser 42 becomes, therefore, comparatively heavy.

The light sensitivity of the tube depends upon the voltage imposed upon adjacent electrodes and, therefore, potentiometer 44, by means of which this voltage can be adjusted, provides a convenient means to adjust the sensitivity of the tube. This potentiometer can be actuated by means of a handwheel 44' shown in Fig. 1 and by means of which the sensitivity of the device can be adjusted to match the sensitivity of the sensitized paper on which subsequently a print is made.

The sensitivity of the device can also be adjusted by changing the size of the light admitting aperture, and two electro-magnetically controlled diaphragm blades 127 and 128 serving this purpose were already shown in Figs. 2 and 3. They are again shown above the multiplier tube 20 in Fig. 4.

It can be seen that current circulating in the last loop between points 39 and 40, and 30 and 29 causes condenser 42 to be charged. Condenser 42 is, by means to be shown later, short circuited before the measuring process begins, and the time required to charge it to predetermined voltage constitutes a measure of the light impinging upon the multiplier tube 20.

Second condenser charging circuit

The second condenser charging circuit is connected across the terminals of condenser 42 in parallel to the first charging circuit. Distinguished from the first charging circuit, however, the current within this second circuit is constant and entirely independent of the light impinging upon the photoelectric multiplier tube 20. The second circuit, therefore, comprises a second source of D. C. voltage and an element which keeps the current in the second charging circuit constant regardless of the voltage to which condenser 42 happens to be charged at any given instant.

The source of D. C. may be of any desired type and could, for example, be a battery. For convenience, however, I have chosen a transformer with a secondary coil 70, a rectifying tube 71 and a condenser 72. The secondary coil 70 could, of course, be associated with its own core and its own primary coil, but it can also, and this is preferable, be mounted on the same iron core 47 which was already provided for the transformer which provided current for the first charging circuit.

The current limiting device which keeps the current within the second charging current constant may be of one of several known types. For example, a screen grid tube has the property to keep the plate current constant within wide limits of plate voltages. I prefer to use as a current limiting element a second photoelectric cell 73 which is, in turn, illuminated by a small incandescent lamp 74 in series with a small rheostat 75. It must be emphasized that the second photoelectric cell 73 has no connection with the photoelectric multiplier tube 20 and is not exposed to the light emanating from the enlarger. This second photocell 73 is merely a convenient means of keeping the current within the second charging circuit constant.

The current circulating within the second charging circuit can be conveniently adjusted by changing the illumination of photocell 73 through manipulation of rheostat 75 which regulates the current passing incandescent lamp 74. Rheostat 75 can be adjusted from the front of the housing 70 of the main unit by means of a handwheel 75'.

Circuits of this type are quite sensitive to accidental leakages and even the most perfect means of insulation cannot completely eliminate any leakage. It is, furthermore, virtually impossible to keep this leakage at a constant value and it may change from day to day, depending, for example, upon temperature and humidity conditions. It is, therefore, a particular advantage of the double charging circuit as described here, that the leakage can be easily compensated for. This can be done by covering the photoelectric multiplier tube 20 so that no light from the enlarger or any other source can reach it. In other words, the first charging circuit will then be currentless except for any accidental leakage. The condenser 42 is then charged by the second charging circuit alone. The time required to charge condenser 42 by the second charging circuit alone to a predetermined voltage can then be measured and if this time differs from a standard, it can be adjusted by moving rheostat 75 in one direction or the other. If, for example, the leakage within the two condenser charging circuits has increased since the last adjustment, the charging time of condenser 42 by the second charging circuit alone will usually be longer than the standard time, and in order to restore the former conditions, the charging current within the second charging circuit must be increased. This can be done by reducing the resistance of rheostat 75 so that lamp 74 becomes brighter and consequently, photocell 73 passes more current. An adjustment in the opposite direction, if desired, can, of course, be made in a corresponding manner.

Thyratron circuit

The purpose of this circuit is to provide means to indicate when the voltage of condenser 42 has reached a predetermined critical value. It consists of a thyratron tube 80, with a cathode 81, a grid 82 and an anode 83. This thyratron is energized by alternating current derived from a secondary coil 84 which is preferably, but not necessarily, mounted on the same iron core 47 as the two other secondaries 46 and 70 described above. The plate circuit of the thyratron is completed by a relay coil 85 actuating a normally closed contact 92 to be described later. The grid of the thyratron is connected to the positive terminal of the condenser 42, and to complete the grid circuit the cathode 81 is connected to a sliding contact 86 of a resistance 87 connected across the terminal of condenser 72. It can be seen that the voltage of the thyratron grid 82 with respect to the cathode 80 consists of the voltage impressed upon the left part of resistance 87 and of the voltage impressed upon condenser 42. The two voltages are of opposite polarity. A thyratron is usually non-conductive as long as its grid voltage with respect to the cathode is more negative than —2 volts and it becomes current conducting as soon as the grid voltage is less than —2 volts negative with respect to the cathode. The result of this arrangement is that as soon as the condenser voltage is more than 2 volts larger than the voltage of the left half of resistance 87, the previously non-current conducting thyratron becomes current conducting, whereupon current begins to flow in relay coil 85.

First time-measuring unit

The two time-measuring units are of identical design and comprise each a constant speed motor directly connected to the line and rotating permanently, an electromagnetic clutch and an output shaft. The output shaft is ordinarily stationary and rotates only when the clutch is energized. This takes place during the time required to charge condenser 42 and consequently the angle of rotation traveled by the output shaft is proportional to the charging time and, therefore, a function of the light impinging upon the electron multiplier tube 20.

The first charging circuit comprises a motor 90 which is preferably of the synchronous type used for clockwork movements or the like. The electromagnetic clutch 91 is shown schematically as a coil in the diagram, but the actual physical appearance of the clutch is shown in Fig. 7 and will be described later. One side of the clutch is directly connected to one leg of the line, and the other side is connected across the two push button contacts, to be described later, and the normally closed contact 92 actuated by relay coil 85 already described above and which is the load element of the thyratron circuit.

Second time-measuring circuit

The second time-measuring circuit is identical to the first time-measuring circuit except that two rotating switch elements are mounted on the output shaft. A constant speed motor 95 is again connected to the line and electromagnetic clutch 96 is connected in the same manner as the corresponding coil 91 of the first time-measuring circuit, i. e., one side of the coil 96 is directly connected to one leg of the line, and the other side is connected across the two push buttons and the same relay contact 92.

Mounted on the output shaft are two rotating switches, the first of which short circuits condenser 42 at suitable intervals, and the second of which actuates one or the other of the solenoids 135 and 136 controlling the two diaphragm blades 128 and 127, respectively. Both switches comprise cylinders 100 and 101, respectively, made from insulating material, but which carry two strips 102 and 103 in the case of cylinder 100, and one strip 105 in the case of cylinder 101 made from brass or some other current conducting material.

Sliding on cylinder 100 are elastic spring contacts 106 and 107. It will be clear that when cylinder 100 rotates, strips 102 and 103 will, at certain times, conductively connect these spring contacts 106 and 107 and thereby short circuit condenser 42 at certain times. The spring contacts 106 and 107 are in series with a normally open relay contact 172, the function of which will be explained later.

In like manner two pairs of spring contacts 109, 110 and 111, 112 slide on cylinder 101 and a metallic strip 105 attached to cylinder 101 will, therefore, at certain times conductively connect 109 to 110 or 111 to 112. The contact pair 109 and 110 is in series with a normally open relay contact 174 and controls solenoid 135 which attracts, when energized, diaphragm blade 128. In like manner contact pair 111, 112 is in series with normally open relay contact 175 and controls solenoid 136 which, when energized, attracts diaphragm blade 127.

*Push button and relay circuit*

In order to make the operation of the device convenient for the operator and fool-proof, the entire circuit is controlled by two relays 150 and 151 and two push buttons 152 and 153. The push buttons are physically mounted on the front panel of the main unit and are shown in Fig. 1.

Each push button has, respectively, a normally closed contact 152' and 153' and a normally open contact 152" and 153". Relay 150 comprises an armature or coil 160, a normally closed contact 161 and two normally open contacts 162 and 163. Relay 151 comprises a coil 170, a normally closed contact 171 and four normally open contacts 172, 173, 174 and 175.

The normally open contact 152" of push button 152 is in series with a normally closed contact 153' of contact 153. In like manner the normally open contact 153" of push button 153 is in series with the normally closed contact 152' of push button 152. This arrangement is a safeguard against the possibility of an ignorant operator depressing both push buttons at the same time. As it is, both push button circuits in such a case would be dead.

The normally open contact 162 of relay 150 is connected in parallel to the normally open push button contact 152". Likewise the normally open contact 173 of relay 151 is connected in parallel to the normally open contact 153" of push button 153. In other words, contacts 162 and 173 serve as "hold in" contacts, and a momentary depression of push buttons 152 and 153, respectively, will energize relay coils 160 and 170 and, in turn, close all the normally open contacts of the respective relays, among them 162 and 173. Since these contacts are connected in parallel to the corresponding normally open push button contacts 152" and 153", the relay coils will remain energized even after the operator releases the push buttons, and this condition will persist until the circuits will be opened at some other place, as will be described later.

The normally closed contacts 161 and 171 are in series with each other and connected across the terminals of condenser 42. This condenser is thereby short circuited unless one of the relays is energized, i. e., before the start of the measuring process. Normally open contact 172 is in series with the spring contacts 106 and 107 sliding on the rotating switch element 100 which is mounted on the output shaft of the second time-measuring unit described above. As a result of this arrangement, the rotating switch element 100 can short circuit condenser 42 only when relay 151 is energized.

Normally open contact 163 energizes, when closed, solenoid 136 which attracts diaphragm blade 127 carrying the smallest diaphragm opening for the photoelectric multiplier tube 20. The result of this arrangement is that as soon as relay 150 is energized, i. e., during the measuring process for the brightest point on the easel, the smallest diaphragm aperture 130 contained in blade 127 is placed in front of the photoelectric multiplier cell 20 and thereby the measuring process for the brightest point on the easel is always performed with the smallest light acceptance or light sensitivity of the photocell.

Normally open contacts 174 and 175 are, respectively, in series with one of the two pairs of spring contacts 109, 110 or 111, 112. Due to this arrangement, rotation of switch element 101 mounted on the output shaft of motor 95 of the second time-measuring unit energizes either solenoid 136 or solenoid 135 or neither. This means that for approximately the first third of a revolution of the output shaft of the second time-measuring unit, the light acceptance of the electron multiplier tube will be governed by the diameter of the smallest aperture 130 in diaphragm blade 127, that for approximately the second third of the revolution, the light acceptance of the cell will be governed by the medium sized aperture 129 in diaphragm blade 128, and for the last third of the revolution, this light acceptance will be governed by the large aperture 125 which is fixedly built into the top wall of the housing of the electron multiplier tube, see Fig. 3. In the interest of simplicity, no means have been shown to energize the filaments of the two rectifying tubes 45 and 71 and of the thyratron 80. These means may, for example, be batteries or filament transformers or, preferably, a few turns of wire may, for each tube, be wound on the core 47 of the transformer which already exists.

MECHANICAL DESIGN OF FIRST TIME-MEASURING UNIT

Figure 5:
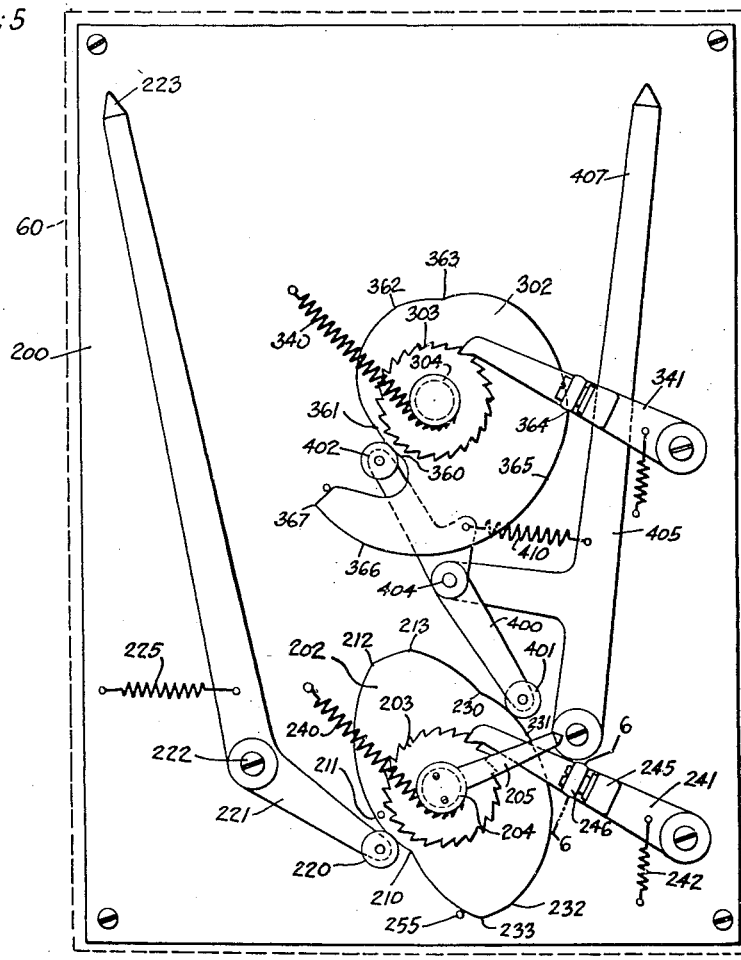
Fig. 5 is a front elevational view of the main unit with the cover removed.
Figure 6:
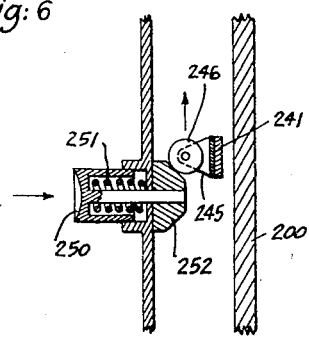
Fig. 6 is a fragmentary sectional view along the plane of line 6—6 in Fig. 5 showing details of the resetting device.

The actual physical appearance of the two time-measuring units can be seen in Figs. 5, 6 and 7. The first time-measuring unit is the lower one and measures the time required to charge the condenser 42 to a predetermined voltage when photocell 20 is placed on the point of brightest illumination on the easel.

It comprises a constant speed motor 90 which is preferably a synchronous motor of the type used for small clock movements or the like. These motors are commercially available with a built-in gear reduction so that the shaft 180 of this motor has only a slow speed; for example, a speed of 2 R. P. M. would be quite suitable. The front end of the shaft is of square or similar crosssection and two discs are carried by this shaft. The first disc 181 is fixedly fastened to this shaft whereas the second disc 182 which is made from iron is free to slide axially a small distance. Two springs 183 tend to retract disc 182 as much as possible.

The clutch coil 91 is preferably surrounded by a cylindrical body of soft iron 185 fastened on the output shaft 186. The coil 91 and the cylindrical body 185 form an electromagnet which, when energized, attracts iron disc 182, thereby causing the entire clutch body and the output shaft 186 to rotate. Current is supplied to coil 91 by means of two flexible cables, which is possible because the clutch and the output shaft never perform more than one revolution. These flexible cables, however, are not shown in the drawings.

The motor 90 is fastened to the baseplate 200 by means of two studs 201, and the output shaft 186 is supported in a bearing 187. The front of the output shaft 186 carries a cam element 202, a ratchet 203, a pulley 204 and a pointer 205. The purpose and coaction of these elements will be described later.

As derived before the measured light intensity is $$L = \frac{i_s}{K}\left(\frac{1}{\frac{T}{T_0}} - 1\right)$$

Means must be provided to convert this light intensity into exposure times and also to convert it into logarithmic light intensity values needed later for the derivation of the measured contrast.

The first implies that the exposure time is determined as a function of, or more specifically, as a value inversely proportional to the intensity of the brightest spot on the easel. Theoretically, it is immaterial whether the exposure time is set in accordance with the light intensity as measured on the brightest point or on the darkest point on the easel, and it is even conceivable to use the average value of the two. In practice, however, it is most convenient to set the exposure time in accordance with the light intensity as measured on the brightest point on the easel because the intensity of this point obviously can be measured with the best of accuracy. This simply means that a print is exposed in such a manner that well exposed shadows can be obtained and this is also in accordance with best photographic practice.

If $S$ is the sensitivity of the photographic paper, $L$ the light intensity measured at the brightest point on the easel and $t$ the exposure time, we have $$t = \frac{1}{SL}$$

by substituting the above value for $L$, we obtain:

$$t = \frac{K}{Si_s}\left(\frac{1}{\frac{T}{T_0} - 1}\right) \quad (1)$$

The problem is how to use this relationship to compute the configuration of a cam which can be mounted on the output shaft of Fig. 6 of the first time-measuring unit. The radius of that cam at any given point must obviously be proportional to the exposure time, but it is also possible to add, or subtract, any desired constant. In other words, the radius of the cam for $t=0$ does not necessarily have to be zero but may have some value which we shall call $C_3$. The proportionality factor between $r$ and $t$ shall be called $a$, so that we have the relation:

$$r = at + C_3 \quad (2)$$

Since the output shaft during the measuring process rotates with a uniform speed, the angle $\varphi$ traveled by it is proportional to $$\frac{T}{T_0}$$

and the proportionality factor of the two shall be called $C_2$ so that:

$$\frac{T}{T_0} = C_2\varphi \quad (3)$$

By combining Formulas 1, 2 and 3 we can compute $r$ and obtain $$r = \frac{aK}{Si_s}\left(\frac{1}{\frac{1}{C_2\varphi} - 1}\right) + C_3$$

In the interest of simplicity, we call $$\frac{aK}{Si_s} = C_1$$

so that the general equation for the cam in a system of polar coordinates becomes:

$$r = C_1\left(\frac{1}{\frac{1}{C_2\varphi} - 1}\right) + C_3$$

A development of this cam is shown in Fig. 8. On the left side the values of $t$ and on the right side the values of $r$ are shown both as function of either $\varphi$ or $$\frac{T}{T_0}$$

It will be noted and it is also obvious from the formula for $r$ that $r$ for $$\frac{T}{T_0} = 1$$

becomes infinite and for values of $$\frac{T}{T_0}$$

approaching unity, it tends to become very large. It is, therefore, impractical to use much more than the left half of this curve and for reasons which will become clear when we later contemplate the corresponding cam for the logarithmic light intensity values, the parts to the extreme left, when $$\frac{T}{T_0}$$

approaches zero also cannot be used. Precisely which parts will be used is, of course, a matter of choice and, in this particular example, I have chosen to use the parts between $$\frac{T}{T_0} = .1 \text{ to } \frac{T}{T_0} = .526$$

This corresponds to a change of exposure times in the ratio of 1:10 or for example, for $$\frac{T}{T_0} = .1$$

$t$ becomes 5 seconds and for $$\frac{T}{T_0} = .526$$

$t$ becomes 50 seconds. The parts of the curve which are actually used have in the interest of clarity been shaded.

The same cam in polar coordinates is shown in Fig. 5. The significant points of the cam in Fig. 8 have been called 210', 211', 212', 213', and they correspond to the points 210, 211, 212, 213 on the actual cam shown in Fig. 5. As can be seen, the portion of the cam between points 212 and 213 has a uniform radius and, therefore, does not really do any work. It would, therefore, be a waste of operating time to construct the circular cam in the same proportions and this section, therefore, has been arbitrarily shortened, as a comparison of the proportions of the circular cam of Fig. 5 to the developed cam of Fig. 8 shows.

Referring to Fig. 5 a cam-following roller 220 is in contact with the cam just described. This cam-following roller is carried by a double ended lever 221 pivotally supported by a stationary pivot 222 fastened to baseplate 200 and biased by a spring 225. While one end of lever 221 carries the roller 220, the other end carries pointer 223. The tip of this pointer is visible through a window in the front panel of the main unit, see Fig. 1, and indicates on a scale 224 the required exposure time.

The condenser charging time measured by the first time-measuring unit must not only be converted into exposure times, but also into logarithmic light intensity values because this value will be needed later for the computation of the measured contrast. This is again done by means of a cam, and in order to compute the configuration of the second cam we start again with the original equation for the light value $$L = \frac{i_2}{K}\left(\frac{1}{\frac{T}{T_0}} - 1\right)$$

In logarithmic terms this equation reads $$\log L = \log \frac{i_2}{K} + \log \left(\frac{1}{\frac{T}{T_0}} - 1\right)$$

The radius R of this cam is proportional to the logarithmic value of L, and again an arbitrary constant may be added thereto since R does not necessarily have to become zero when log L becomes zero. We have therefore $$R = b + C_5 \log L$$

where $b$ and $C_5$ are constants. Substituting the above value of log L:

$$R = b + C_5 \log \frac{i_2}{K} + C_5 \log \left(\frac{1}{\frac{T}{T_0}} - 1\right)$$

The angle $\varphi$ of the cam, in a system of polar coordinates, is again proportional to $$\frac{T}{T_0}$$

the proportionality factor being called $C_6$, and for convenience, the terms $$b + C_5 \log \frac{i_2}{K}$$

can be lumped together to form a new constant $C_4$. The equation of the cam in polar coordinates therefore reads:

$$R = C_4 + C_5 \log \left(\frac{1}{C_6 \varphi} - 1\right)$$

A development of this cam is shown in Fig. 9. On the left side we have log L, and on the right side R, both as functions of $$\frac{T}{T_0} \text{ or } \varphi$$

For $$\frac{T}{T_0} = 0$$

log L becomes infinite and for $$\frac{T}{T_0} = 1$$

log L becomes negatively infinite. The usable portion of that cam must, therefore, not approach the zero value or the unity value of $$\frac{T}{T_0}$$

too closely. As a convenient value, I have chosen to start with $$\frac{T}{T_0} = .1$$

and extend the cam to $$\frac{T}{T_0} = .526$$

which means that log L varies between .954 and —.046; in other words, the difference between the two logarithmic values is one, or the linear light intensity for $$\frac{T}{T_0} = .1$$

is 10 times as large as the linear light intensity for $$\frac{T}{T_0} = .526$$

As can be seen in Fig. 9, the initial value of R for $$\frac{T}{T_0} = 0$$

has been chosen rather large and the useful area of the cam in the developed presentation in Fig. 9 has again been shaded for convenience. The actual cam can be seen in Fig. 5. The significant points of the developed cam in Fig. 9 have been called 230', 231', 232' and 233'. They correspond to points 230, 231, 232 and 233 on the actual circular cam shown in Fig. 5. Again, the radius of the cam between points 232 and 233 is constant so that no real work is performed in this portion. This part has, therefore, been arbitrarily shortened in order to save operating time, as a comparison between the circular cam illustrated in Fig. 5 and the developed cam illustrated in Fig. 9 will show.

While it would, of course, be entirely feasible and practical to have the two cams individually and separately mounted in two planes on shaft 186, the actual construction can be somewhat simplified due to the fact that either cam occupies less than 180°. This makes it possible to arrange both cams in one plane so that the two apparently constitute one single cam which is shown in Fig. 5. The left half of this cam performs the function of converting the measured condenser charging time into paper exposure time, whereas the right half of this cam performs the function of converting the same condenser charging time into logarithmic light intensity values. The two parts are connected by lines 213—230 and 210—233 which may be of any convenient shape.

Since, during operation of the device, i. e., during the measuring process, the output shaft 186 with all the elements connected thereto moves from the zero position into some position indicative of the measured light value, it becomes necessary to provide means to keep these elements in the extreme position which they occupy after the light measuring process has been terminated by action of thyratron 80 and the relays controlled thereby. Likewise means must be provided to return all these parts to their original starting position at the option of the operator before a new measuring process can be started. Referring to Fig. 5 a ratchet gear 203 and a pulley 204 have already been described which are fastened to the output shaft 186 of the first time-measuring unit. Attached to pulley 204 is a spring 240 which biases all elements attached to shaft 186 in a clockwise direction. Cooperating with ratchet gear 203 is a ratchet 241 which is under the influence of a spring 242 and which prevents thereby ratchet gear 203 from returning to its starting position in a clockwise direction, which it is urged to do by the tension of spring 240.

Fastened to ratchet 241 is a small bracket 245 which carries a roller 246. A push button 250 is mounted on the front panel of the main unit which is pressed rearwardly by a spring 251 and which carries a tapered part 252. This tapered part is in contact with roller 246.

During the charging time of the condenser the clutch is energized and, therefore, shaft 186 with ratchet gear 203 rotates in a counter-clockwise direction. As soon as condenser 42 has reached a predetermined voltage the clutch is deenergized and, therefore, shaft 186 ceases to rotate. Spring 240 urges the shaft and the elements connected with it to return in a clockwise direction into their starting position, but as long as ratchet 241 is in operative engagement with ratchet gear 203 this is rendered impossible. In other words the ratchet gear 203 is arrested in its extreme counter-clockwise position. The two cams on the circumference of element 202 rotate, of course, by the same angle and affect, therefore, the position of pointer 223 as well as the position of a differential mechanism for the indication of the contrast which will be described later.

When the operator chooses to reset the first time-measuring device because the indicated measurement is no longer wanted, or because another measurement is desired, he depresses push button 250. Push button 250 with the associated tapered part 252, Fig. 6, moves from left to right, causing roller 246 to perform a corresponding vertical movement. This, in turn, causes ratchet 241 to swivel slightly around its supporting pivot, bringing its tip out of engagement with ratchet wheel 203, whereupon the pull of spring 240 can exert itself and return the ratchet wheel 203 with the cam 202 and shaft 186 into its starting position. This starting position is determined by a pin 255 mounted on a base-plate 200.

A pointer 205, shown in Fig. 7, was already described and is carried on the extreme front end of shaft 186. This pointer is used to determine the proper leakage conditions of the device. The operation of this leakage indicator will be described later.

Mechanical Design of Second Time-Measuring Unit

The design of this unit is in many respects identical with the design of the corresponding first unit. It comprises a constant speed motor 95, a clutch 96 and an output shaft 286. Mounted on this output shaft is a cam 302, a ratchet gear 303 and a pulley 304, see Fig. 7. Fastened to pulley 304 is a spring 340 which biases the entire output shaft assembly in a clockwise direction. Cooperating with ratchet gear 303 is a ratchet 341 associated with a push button controlled resetting device in precisely the same manner as in the first time-measuring unit. The corresponding push button 350 can be seen in Fig. 1.

The second time-measuring unit differs from the first time-measuring unit in two respects: Two rotating switch elements 100 and 101 are mounted on the output shaft 286, and a different cam is provided.

The two rotating switch elements 100 and 101 cooperate with spring contacts shown in Fig. 4. The electrical function of this arrangement has already been explained.

The purpose of the cam associated with the second time-measuring unit is to give an indication of the logarithmic light intensity value of the darkest point measured on the easel. This is in some respects more difficult than the corresponding indication of logarithmic light intensity value for the brightest point on the easel because here the range could be limited to a ratio of 1:10. In view of the fact that the operator can adjust the light output of the enlarger by means of the diaphragm or by other means within fairly wide limits, this limitation appears reasonable, but a similar limitation cannot be imposed upon the range in which the darkest point may fall. The reason for this is obvious. Not only may the light intensity of the brightest point vary in the proportion of 1:10, but the contrast of the negative itself may vary within the range of approximately 1:100. These two ranges together determine the expected range of the light intensity for the darkest point which may, therefore, be of the general order of 1:1000. In order to accommodate this exceedingly wide range the following means are employed:

The second time-measuring unit is made to run through an operating cycle substantially identical to the operating cycle of the first time-measuring unit, but not once but three times. Between these operating cycles the condenser is automatically discharged since it is short circuited by the action of switch element 100, see Fig. 4, mounted on the output shaft 286. During the first operating cycle the smallest aperture 130 is placed in front of the photoelectric multiplier tube 20. During the second operating cycle the next larger diaphragm opening 128 is in this position, and for the third operating cycle the light admittance of the cell is controlled by the aperture 125 which is still larger and which is in the top wall of the photocell housing 121. This change of apertures is effected by the action of the switch element 101 which, during the first cycle, energizes solenoid 136, which energizes solenoid 135 during the second cycle, and which renders both solenoids currentless during the third cycle. As a result of this change of apertures, the light sensitivity of the device is systematically increased from cycle to cycle, and if condenser 42 fails to reach the predetermined voltage at which it actuates thyratron 80 and stops motor 95 during the first cycle, because, due to the small aperture, the photocell current is too small, it may do so during the following or the next following cycle, when the photocell current, due to the larger aperture, is correspondingly higher.

It is understood that in reality the second time-measuring unit will run through all three cycles only if the negative to be measured is of rather extreme contrast. For ordinary negatives, motor 95 will come to a standstill much earlier, usually during the second cycle, and in the case of very flat negatives, motor 95 may even stop during the first operating cylcle.

The design of cam 302 is based on this triple cycle, and a developed representation of it is shown in Fig. 10. It can be seen that the effective circumference of the cam has three divisions, each of which are substantially identical to the configuration of the cam shown in Fig. 9. The three branches of the curve are, of course, radially displaced with respect to each other in such a way that the maximum radius of one portion is identical with the minimum radius of the adjacent portion. The formulae for these branches are precisely identical to the formula for the cam curve in Fig. 9 with the exception, of course, that different constants may be chosen:

$$R_1 = C_7 + C_8 \log \left( \frac{1}{C_9 \varphi} - 1 \right)$$

$$R_2 = C_{10} + C_{11} \log \left( \frac{1}{C_{12} \varphi} - 1 \right)$$

$$R_3 = C_{13} + C_{14} \log \left( \frac{1}{C_{15} \varphi} - 1 \right)$$

The significant points of the developed cam of Fig. 10 are 360', 361', 362', 363', 364', 365', 366' and 367' which correspond to points 360 to 367 of the circular cam in Fig. 5. Again, certain parts with a constant radius have been arbitrarily shortened to save operating time. In the development of this cam shown in Fig. 10, I have also illustrated in the interest of clarity the function of the two circuit elements 100 and 101 to show the angular relations between the effective parts of these elements and the three branches of the cam.

CONTRAST INDICATOR

The contrast indicator is a mechanical movement adapted to indicate the difference between the two logarithmic light values, which is the definition of photographic contrast, or in mechanical terms the difference between the radius of the logarithmic part of cam 202 and the radius of cam 302. While a great number of mechanisms are conceivable which would serve this purpose, I prefer the following construction which is exceedingly simple:

A pivoted lever 400 carries two cam-following rollers 401 and 402 which are in contact with cams 202 and 302, respectively. The pivot point of this lever is 404 which is carried by a second pivoted lever 405. This last lever is supported by a stationary pivot 406 fastened to baseplate 200, and carries on its other end a pointer 407. This pointer is visible through a window of the front panel of the main unit and indicates contrast values on a scale 408, see Fig. 1. A spring 410 biases lever 400 in a clockwise direction. Due to this bias the two cam-following rollers 401 and 402 are always in contact with cams 202 and 302, respectively.

The function of this device is quite simple. Assuming that only cam 202 moves and cam 302 remains stationary, any increase or decrease in the radius of cam 202 will cause lever 400 to swivel around the contact point between cam 302 and roller 402. It can be easily seen that pivot point 404 then performs a movement equal to half the increase or decrease of the radius of cam 202. In like manner, assuming that cam 202 remains stationary and cam 302 rotates, lever 400 performs a rotary movement around the contact point of roller 401 and cam 202, and the pivot point 404 participates in this movement to the extent that it is displaced by half of the displacement of roller 402 or, which is the same, by half the increase or decrease of the radius of cam 302.

It can be seen that an increase of the radius of cam 202 as well as an increase in the cam 302 will cause lever 400 to rotate in a counter-clockwise direction. If the two increments are the same, pivot point 404 will remain stationary, and consequently lever 405 with pointer 407 will also remain stationary. If, however, the increase of the radius of cam 202 is different from the increase of the radius of cam 302, pivot point 404 will be displaced and this displacement will equal half the difference of the two radial increases, or the displacement of pivot point 404 and therewith the movement of lever 405 and pointer 407 will be in proportion to the difference of the two radii or of the two logarithmic light intensities. In other words, pointer 407 will indicate on scale 408 the contrast of the image projected on the easel.

The angles of the arcs described by rollers 401 and 402, and by point 404, must, of course, be reasonably small, so that the arcuate paths of these elements do not deviate appreciably from straight lines.

OPERATION

From the operator's viewpoint the operation of the device is exceedingly simple. The operator first ascertains whether the pointers 223 and 407 are at the lowest points of scales 224 and 408, respectively. If they are not, he depresses push buttons 250 and 350 and causes thereby the two indicators to return to their starting points.

The operator then tests the leakage conditions of the device by covering the photocell and depressing button 152, the "on" button for the brightest point on the easel. After a short interval of time, pointer 205 should then appear in window 257 and come to a standstill in register with line 256. If the pointer 205 overshoots this line or comes to a standstill before it reaches it the device has either more or less leakage than expected and this can be changed by adjusting knob 75' in one direction or the other. The device should then be reset by depressing button 250 and tried against by depressing push button 152 until pointer 205 comes to a standstill on line 256. The device is then reset by depressing push button 250 again. Handwheel 44' must, before the final operation of the device, be adjusted for the sensitivity of the sensitized paper which the operator expects to use for the print. The photocell is then uncovered and placed on the easel of the enlarger in which a negative has been placed and which has been adjusted for the desired magnification ratio and diaphragm setting of the lens. The photocell is then shifted on this easel until the brightest point on the image falls on the window in the top wall of the photocell housing. Pushbutton 152 is then depressed and the operator waits until the movement initiated thereby is finished. The photocell is then shifted until the darkest point on the easel is projected into the window. Push button 153 is now depressed and when the movement induced thereby is finished, pointers 223 and 407 indicate exposure time and contrast, respectively. What happens within the device will be described in the following paragraphs:

When the operator depresses push buttons 250 and 350 for resetting purposes, he lifts the tips of ratchets 241 and 341 so as to bring them out of engagement with the ratchet gears 203 and 303, see Figs. 5 and 6. In the case of push button 250 this is done by the action of the tapered part 252 which by its horizontal movement from left to right forces roller 246 upward. This roller is supported by a bracket 245 which, in turn, is fastened to the ratchet 241. Push button 350 is, of course, associated with a corresponding mechanism which actuates ratchet 341. As soon as the two ratchets lose contact with ratchet gears 203 and 303, springs 240 and 340 which are fastened to pulleys 204 and 304 cause these pulleys together with all elements mounted on the respective output shafts 186 and 286 of the first and second time-measuring unit to rotate in a clockwise direction until they are stopped by stop pins 255 and 355, i. e., until all these elements assume the position shown in Fig. 5.

For the test of the leakage conditions of the device the photoelectric multiplier cell 20 should be covered, i. e., no current should circulate between the taps of the potentiometer 41 and the corresponding electrodes of the multiplier tube 20 except such leakage currents as are inevitable due to the impossibility of providing perfect insulation. The condenser 42 is then charged solely by the current supplied by the second charging circuit, i. e., by the current passing from condenser 72 through the current limiting photocell 73. Condenser 72, in turn, is charged from the transformer secondary coil 70 through rectifying tube 71, and the current passing current limiting photocell 73 depends upon the illumination which this photocell receives from the small incandescent lamp 74. This current can be adjusted by rheostat 75 actuated by handwheel 75'. Any adjustment of rheostat 75 will increase or decrease the light of incandescent lamp 74 and thereby increase or decrease the current circulating within the second charging circuit of the condenser, and this will charge condenser 42 faster or slower. If the charging time of the condenser 42 should be different from a standard time the leakage somewhere in the system has obviously changed, and the original time required to charge condenser 42 to a predetermined voltage by the second charging circuit alone can be restored by adjusting rheostat 75 in one direction or the other.

The sensitivity of the photocell 20 can be adjusted by adjusting potentiometer 44. Mechanically this is done by manipulating handwheel 44'. The adjustment of potentiometer 44 changes the voltage impressed upon adjacent electrodes of the photo multiplier tube, and this is a very effective means for adjusting the sensitivity of this cell to light. This adjustment is used to change the light sensitivity of the photocell in proportion to the light sensitivity of the sensitized bromide paper which the operator has selected for the future print.

For the final operation of the device, it is immaterial whether the brightest or the darkest point on the easel is measured first, and merely by way of example I shall describe the measuring process for the brightest point first. Before the start of this measuring process, push button 250 must, of course, be pressed again so that the device starts from the zero setting. Referring to the circuit diagram shown in Fig. 4 it can be seen that condenser 42 before the beginning of the measuring process is short circuited by normally closed relay contacts 161 and 171 connected in series with each other. The two motors 90 and 95 are permanently connected to the line and rotate continuously, but since the clutches 91 and 96 are deenergized the output shafts 186 and 286 of the two time-measuring units are stationary. The operator now depresses push button 152. This closes the normally open push button contact 152'' and closes a circuit which is in series with the normally closed push button contact 153 'of the second push button 153, and with the normally closed contact 92 of relay 85, thereby energizing relay coil 160 and clutch coil 91. Clutch coil 91 causes magnet 185 to attract iron disc 182 whereupon output shaft 186 with all the elements associated with it begins to rotate in a counter-clockwise direction, see Figs. 7 and 5. As soon as relay coil 160 becomes energized, normally open relay contact 162 closes, normally closed relay contact 161 opens and normally open relay contact 163 closes. 162 is connected in parallel to 152'' therefore constitutes a "hold-in" contact keeping relay coil 160 energized even after the operator ceases to depress push button 152. The opening of 161 interrupts the short circuit of condenser 42 which now begins to accumulate a charge by the combined actions of the first and second charging circuit. The closing of contact 163 causes current to a pass solenoid 136 attracting diaphragm 127 and placing the smallest aperture 130 in front of the photosensitive electrode 21 of the photoelectric multiplier tube 20. The light striking this photosensitive electrode causes a relatively small number of electrons to strike the next electrode 22 where they release secondary electrodes which, in turn, strike electrode 23 and release, therefore, tertiary electrons, and this is repeated at each subsequent electrode. The electrons released at each electrode are more numerous than the electrons causing their release and, consequently, a relatively heavy current begins to circulate in the last loop of the network connecting the taps of potentiometer 41 to corresponding electrodes of tube 20. This loop is formed by the connections between points 39 and 40 to electrodes 29 and 30, respectively. The consequence of this circulating current is that condenser 42 accumulates a charge, its upper terminal becoming more and more positive and its lower terminal becoming more and more negative. The upper terminal is connected to the grid 82 of thyratron 80 and the lower terminal is connected in series with the left portion of potentiometer 87 to the cathode 81 of this thyratron. Condenser 42 and the left portion of potentiometer 87 are of opposite polarity, and at the beginning of the measuring circuit the grid of the thyratron is, therefore, highly negative with respect to the cathode. This negative bias diminishes during the measuring process and, as soon as the difference becomes small enough, the thyratron which, due to the negative bias has not conducted any current up to now, breaks down and becomes current conducting. This usually takes place when the grid becomes less than −2 volts negative with respect to the cathode. The time required to charge condenser 42 up to the critical voltage necessary for this condition thereby constitutes a measure of the intensity of the light impinging upon the photosensitive electrode 21 of the multiplier tube 20. As soon as the thyratron 80 begins to conduct current, alternating current originating in secondary transformer coil 84 energizes relay coil 85, thereby opening the normally closed contact 92. The opening of this contact 92 interrupts the current which kept relay coil 160 and clutch 91 energized, whereupon relay contacts 162 and 163 become open and contact 161 becomes closed again. This last action short circuits and thereby discharges condenser 42 which is now ready for the next measuring process. During the time required to charge condenser 42 to its critical voltage, output shaft 186 of the first time-measuring unit, Fig. 7, keeps rotating due to the action of clutch 91 connecting output shaft 188 to the shaft 189 of motor 90. The angle of this rotation is proportional to the time required to charge the condenser and is thereby a measure of the light intensity of the brightest point of the easel. Cam 202 participates in this rotation and causes a corresponding movement of cam-following roller 220 and lever 221 with its pointer 223 indicating the required exposure time on scale 224. It also causes a movement of cam-following roller 401 and a movement of levers 408 and 405. The position that these last two parts assume after the end of the first time-measuring process is, however, of no significance so long as the intensity of the darkest point of the easel has not yet been measured.

The intensity of the darkest point on the easel is measured by shifting the photocell 20 with its housing until this darkest point is projected into the window of this housing. After push button 153 is depressed, another condenser charging and time-measuring process is initiated which electrically is identical to the process applied to the brightest point on the easel just described. However, due to the fact that the light intensity of the darkest point of the easel may possibly change within much wider limits than the light intensity of the brightest point, provisions have been made to cause the second time-measuring device to run through its operating cycle not once, as the first time-measuring unit, but three times. Progressively larger apertures are placed in front of the photocell for the three subsequent cycles, and the condenser 42 is automatically discharged between cycles. For the following detailed description it may be presupposed that we are dealing with an extremely contrasty negative. What happens in this case is as follows:

As soon as the operator depresses push button 153, he closes the normally open push button contact 153'' and closes a circuit which is in series with the normally closed push button contact 152' of the first push button 152 and with the normally closed contact 92 of relay coil 85, thereby energizing relay coil 170 and clutch coil 96. Energizing clutch coil 96 causes the output shaft 286 with all the elements associated with it to rotate in a counter-clockwise direction, see Figs. 5 and 7. As soon as relay coil 170 becomes energized, normally open relay contact 173 closes, normally closed contact 171 opens, normally open contact 172 closes and the two normally open contacts 174 and 175 close. 173 is connected in parallel to 153'' and therefore constitutes a "hold-in" contact keeping relay coil 170 energized even after the operator ceases to depress push button 153. The opening of 171 interrupts the short circuit of condenser 42 which now again begins to accumulate a charge. The closing of contact 172 makes it possible for the current conducting strips 102 and 103 on rotating switch element 100 to connect spring contacts 106 and 107 and thereby to discharge condenser 42. This, however, takes place only between the first and second, and between the second and third operating cycle. In like manner the closing of contacts 174 and 175 makes it possible for the current conducting strip 105 on rotating switch element 101 to short either spring contacts 111, 112 or spring contacts 109, 110. The first pair is shorted during the first operating cycle thereby energizing solenoid 136 and placing the smallest aperture 130 in front of the light sensitive electrode 21 of photocell 20. The second pair of spring contacts 109, 110 is shorted during the second operating cycle thereby energizing solenoid 135 which places the next larger aperture 129 in front of the photocell 20. During the third operating cycle neither pair of spring contacts is connected and both solenoids 135, 136 are, therefore currentless during this period. Consequently, the light admittance of the photocell is then controlled entirely by the largest aperture 125 built into the housing of the photocell.

Condenser 42 is again charged in precisely the same manner as described above by the combined action of the first and of the second charging circuit and again renders thyratron 80 current conducting as soon as it accumulates enough charge to render the grid of this thyratron less than −2 volts negative with respect to the anode. We have assumed that we are dealing with an extremely constrasty negative. In this case the darkest point will receive so little light that condenser 42 does not reach the critical voltage during the first operating cycle or, in mechanical terms, points 362 of the cam circumference will pass cam-following roller 402 and still the condenser will not have reached a voltage high enough to bring the device to a standstill by the action of thyratron 80 and relay coil 85 with its normally closed contact 92. The consequence is that motor 95 keeps on rotating. The rotating switch element 100 then discharges the condenser 42 and opens the circuit again so that the second operating cycle begins and condenser 42 can accumulate a charge again. Since we assumed that the negative is extremely contrasty and the darkest point, therefore, receives very little light, the condenser 42 will still not reach the critical voltage during the second operating cycle even though the light admittance of the photocell is now ten times larger due to the larger area of aperture 129 now in front of the photocell because rotating switch element 101 now energizes solenoid 135 thereby attracting diaphragm blade 128. In other words, point 364 on the circumference of the cam will also pass cam-following roller 402 without the condenser having reached the critical voltage where thyratron 80 becomes current conducting. Again rotating switch element 100 shortcircuits condenser 42 and rotating switch element 101 now renders both solenoids 135 and 136 currentless. The light admittance of the photocell is now governed by the large aperture 125 in the top wall of the photocell housing. During the third operating cycle, i. e., after point 365 of the coil 302 has passed cam-following roller 402, condenser 42 will again become charged, but this time at a still higher rate of speed due to the now 100 times higher light admittance of the largest aperture 125. Eventually when some point between points 365 and 366 of cam 302 passes cam-following roller 402 the condenser 42 will have a voltage sufficiently high to render grid 82 less than −2 volts negative with respect to the cathode 81 of thyratron 80, whereupon this thyratron becomes current conducting and causes relay coil 85 to open normally closed relay contact 92. The opening of this contact in turn opens relay coil 170 and the clutch coil 96, thereby bringing the entire measuring process to an end, and output shaft 286 with its associated parts to a standstill.

For less contrasty negatives the critical point may be reached long before the second time-measuring unit enters its third operating cycle. The device may, for example, come to a standstill sometime during the second operating cycle, i. e., when cam-following roller 402 is in contact with some point between points 363 and 364. For negatives of very low contrast this may even take place during the first operating cycle, i. e., when roller 402 is in contact with some point of the cam between points 361 and 362.

It has been explained above that the mechanical movement which comprises the two cam-following rollers 401 and 402, first pivoted lever 404 and second pivoted lever 405 with its pointer 407, assumes a position which is indicative of the difference between the radii of the respective cams 202 and 302 or proportional to the difference of the logarithmic light intensity values of the brightest and darkest point on the easel. The position of pointer 407, therefore, indicates on scale 408 the contrast of the image.

It is obvious that various changes of form, proportion, minor details and combination of parts may be resorted to without departing or sacrificing any of the advantages of the invention, as defined in the appended claims.

What I claim as new, is:

1. A print control instrument for photographic enlargers which include a source of light and project an image of a photographic negative on a sheet of sensitized material placed on an easel, comprising a photoelectric cell, adapted to be placed successively on the two points of brightest and darkest light intensity on said easel, respectively, an electrical circuit operatively connected to said cell and including a condenser adapted to change its voltage upon exposure of said photoelectric cell to light, a first and a second measuring device adapted to measure the time required by said condenser to change its voltage by a predetermined magnitude when said photoelectric cell is placed on the brightest and darkest point on the easel, respectively, each of said measuring devices including an output shaft adapted to rotate with a constant speed during the time required for said voltage change, mechanism operatively associated with the output shaft of said first measuring device converting its rotary travel into a movement inversely proportional to the light intensity of the brighest point of the easel and an element actuated by said mechanism indicating exposure time, means also operatively associated with the output shaft of said first measuring device converting its rotary travel into a movement proportional to the logarithmic value of the light intensity of the brightest point on the easel, means operatively associated with the output shaft of said second measuring device converting its rotary travel into a movement proportional to the logarithmic value of the light intensity of the darkest point on the easel, and mechanism operatively associated with said two last named means indicating the difference of two logarithmic light intensities and an element actuated by said last named mechanism indicating contrast.

2. A print control instrument according to claim 1, having a first and a second parallel charging circuit operatively connected to said condenser, said condenser adapted to be charged by them simultaneously, said first charging circuit comprising a first source of voltage and said photoelectric cell, adapted to be placed substantially into the same plane as said sensitized sheet during the actual exposure, said first source of voltage, said photoelectric cell and said condenser connected in series, whereby said condenser, upon exposure of said photoelectric cell to light, is charged with a rate of speed depending upon the intensity of said light, said second charging circuit comprising a second source of voltage and means to limit the current of said second charging circuit to a substantially constant value, said second source of voltage, said means to limit the current, and said condenser connected in series, whereby said condenser is charged with a constant rate of speed, independent of the intensity of said light.

3. A print control instrument according to claim 1, having a first and a second parallel charging circuit operatively connected to said condenser, said condenser adapted to be charged by them simultaneously, said first charging circuit comprising a first source of voltage and a photoelectric cell, adapted to be placed substantially into the same plane as said sensitized sheet during the actual exposure, said photoelectric cell being of the multiplier type including a photo emissive cathode and $n$ anodes, said source of voltage including a voltage divider with a starting tap and $n$ additional taps, the starting tap being of negative polarity and connected to said cathode, the other taps being progressively more positive and connected to corresponding anodes of the multiplier tube, and said condenser being inserted into the connection between the $(n-1)$st tap and the $(n-1)$st anode, whereby said condenser, upon exposure of said photoelectric cell to light, is being charged with a rate of speed in dependence of the intensity of said light, said second charging circuit comprising a second source of voltage and means to limit the current of said second circuit to a substantially constant value, said second source of voltage, said means to limit the current, and said condenser being connected in series, whereby said condenser is being charged with a constant rate of speed, independent of the intensity of said light.

4. A print control instrument according to claim 1, having a first and a second parallel charging circuit and operatively connected to said condenser, said condenser adapted to be charged by them simultaneously, said first charging circuit comprising a first source of voltage and said photoelectric cell, adapted to be placed substantially into the same plane as said sensitized sheet during the actual exposure, said first source of voltage, said photoelectric cell and said condenser connected in series, whereby said condenser, upon exposure of said photoelectric cell to light, is charged with a rate of speed depending upon the intensity of said light, said second charging circuit comprising a second source of voltage and means to limit the current of said second charging circuit to a substantially constant value, said second source of voltage, said means to limit the current, and said condenser connected in series, whereby said condenser is charged with a constant rate of speed, independent of the intensity of said light, and means to adjust said current limiting means until, without any light impinging on said photoelectric cell, said condenser is charged by said second charging circuit alone to a predetermined voltage in a predetermined time, whereby any accidental leakage in the circuit of said condenser can be substantially compensated for.

5. A print control instrument according to claim 1, having a first and a second parallel charging circuit operatively connected to said condenser, said condenser adapted to be charged by them simultaneously, said first charging circuit comprising a first source of voltage and a first photoelectric cell, adapted to be placed substantially into the same plane as said sensitized sheet during the actual exposure, said first source of voltage, said first photoelectric cell, and said condenser connected in series whereby said condenser, upon exposure of said photoelectric cell to light, is charged with a rate of speed in dependence of the intensity of said light, said second charging circuit comprising a second source of voltage and means to limit the current of said second circuit to a substantially constant value, said second source of voltage, said means to limit the current, and said condenser connected in series, whereby said condenser is charged with a constant rate of speed, independent of the intensity of said first mentioned source of light, said means to limit the current comprising a second photoelectric cell and means to illuminate said second photoelectric cell with a constant intensity, independent of the intensity of said first mentioned source of light within said enlarger.

6. A print control instrument according to claim 1, having a first and a second parallel charging circuit operatively connected to said condenser, said condenser adapted to be charged by them simultaneously, said first charging circuit comprising a first source of voltage and a first photoelectric cell, adapted to be placed substantially into the same plane as said sensitized sheet during the actual exposure, said first source of voltage, said first photoelectric cell, and said condenser connected in series whereby said condenser, upon exposure of said photoelectric cell to light, is charged with a rate of speed in dependence of the intensity of said light, said second charging circuit comprising a second source of voltage and means to limit the current of said second circuit to a substantially constant value, said second source of voltage, said means to limit the current, and said condenser connected in series, whereby said condenser is charged with a constant rate of speed, independent of the intensity of said first mentioned source of light, said means to limit the current comprising a second photoelectric cell and means to illuminate said second photoelectric cell with an intensity independent of the intensity of said first mentioned source of light within said enlarger, and means to adjust said last named means to illuminate to adjust the current of said second charging circuit, until said condenser, without any light impinging upon said first photoelectric cell, becomes charged by said second charging circuit alone to a predetermined voltage in a predetermined time, whereby any accidental leakage in the circuit of said condenser can be substantially compensated for.

7. A print control instrument according to claim 1, said photoelectric cell being of the multiplier type including a photo emissive cathode and a plurality of anodes, said circuit associated with said cell comprising a source of direct current and a voltage divider connected thereto with a starting tap and a plurality of additional taps, the number of additional taps being equal to the number of anodes, the starting tap being of negative polarity and connected to said cathode, the other taps being progressively more positive and connected to corresponding anodes of the multiplier tube, and means to adjust the voltage of said direct current whereby the light sensitivity of said photoelectric cell can be changed in accordance with the light sensitivity of said sensitized sheet.

8. A print control instrument according to claim 1, said electric circuit comprising means to short circuit said condenser before the start of the measuring process, a source of current in series with said condenser and said photoelectric cell, means to render said means to short circuit inoperable after the start of the measuring process, whereby said condenser accumulates a charge which increases during the measuring process at a rate of speed in accordance with the intensity of the light impinging upon said photoelectric cell, and means to indicate when said charge equals a voltage of a predetermined magnitude.

9. A print control instrument according to claim 1, said electric circuit comprising means to shortcircuit said condenser before the start of the measuring process, a first source of direct current in series with said condenser and said photoelectric cell, means to render said means to shortcircuit inoperable after the start of the measuring process, whereby said condenser accumulates a charge which increases during the measuring process at a rate of speed in accordance with the intensity of the light impinging upon said photoelectric cell, and means to indicate when said charge equals a voltage of a predetermined magnitude, including a thyratron with a grid circuit and an anode circuit, said grid circuit comprising a second source of direct current, the positive terminal of said second source connected to the cathode of the thyratron, the negative terminal of said second source connected to the negative terminal of said condenser, and the positive terminal of said condenser connected to the grid of the thyratron, whereby the voltage of said grid with respect to the cathode of said thyratron becomes equal to the difference of the voltages of said second source of direct current and of said condenser, so that the thyratron is rendered nonconducting before and during the light measuring process as long as said condenser voltage is small and the grid therefore highly negatively biased with respect to the cathode, but becomes current conductive at the end of the measuring process as soon as said voltage difference, due to the rising condenser voltage, falls below a critical value, and said anode circuit including a source of alternating current and a load device, in series connection with said thyratron and said source of alternating current, and actuated by the anode current of said thyratron at the end of the measuring process.

10. A print control instrument according to claim 1, said electric circuit comprising means to shortcircuit said condenser before the start of the measuring process, a source of current in series with said condenser and said photoelectric cell, means to render said means to shortcircuit inoperable after the start of the measuring process, whereby said condenser accumulates a charge which increases during the measuring process at a rate of speed in accordance with the intensity of the light impinging upon said photoelectric cell, means to indicate when said charge equals a voltage of a predetermined magnitude, each of said two time-measuring devices comprising a constant speed motor, an electromagnetic clutch, an output shaft, means to keep said clutch deenergized before the measuring process, and means operatively connected to said means to indicate to energize said clutch during and deenergize it at the end of the measuring process, whereby said output shaft rotates during the charging time of said condenser, the angle of rotation being proportional to said charging time of said condenser and thereby in accordance with light intensity to be measured.

11. A print control instrument according to claim 1, said electric circuit comprising means to shortcircuit said condenser before the start of the measuring process, a first source of direct current in series with said condenser and said photoelectic cell, means to render said means to shortcircuit inoperable after the start of the measuring process, whereby said condenser accumulates a charge which increases during the measuring process at a rate of speed in accordance with the intensity of the light impinging upon said photoelectric cell, means to indicate when said charge equals a voltage of a predetermined magnitude, including a thyratron with a grid circuit and an anode circuit, said grid circuit comprising a second source of direct current, the positive terminal of said second source connected to the cathode of the thyratron, the negative terminal of said second source connected to the negative terminal of said condenser, and the positive terminal of said condenser connected to the grid of the thyratron, whereby said thyratron is rendered nonconducting before and during the measuring process, but becomes conductive at the end of said process, said anode circuit including a source of alternating current and a relay with an armature and contacts, said armature in series connection with said thyratron and said source of alternating current, and actuated by the anode current of said thyratron at the end of the measuring process, each of said two time-measuring devices comprising a constant speed motor, an electromagnetic clutch, an output shaft, means to keep said clutch deenergized before the measuring process, and means operatively connected to said relay contacts to energize said clutch during and deenergize it at the end of the measuring process, whereby said output shaft rotates during the charging time of said condenser, the angle of rotation being proportional to said charging time of said condenser and thereby in accordance with the light intensity to be measured.

12. A print control instrument according to claim 1, said electric circuit comprising means to shortcircuit said condenser before the start of the measuring process, a source of current in series with said condenser and said photoelectric cell, means to render said means to shortcircuit inoperable after the start of the measuring process, whereby said condenser accumulates a charge which increases during the measuring process at a rate of speed in accordance with the intensity of the light impinging upon said photoelectric cell, means to indicate when said charge equals a voltage of a predetermined magnitude, each of said two time-measuring devices comprising a constant speed motor, an electromagnetic clutch, an output shaft, means to keep said clutch deenergized before the measuring process, and means operatively connected to said means to indicate to energize said clutch during and deenergize it at the end of the measuring process, and means urging said shaft to return to its starting position, means maintaining said shaft after the end of the measuring process in its most advanced position against said urging means, and means under control of the operator to render said last named means inoperative for resetting purposes.

13. A print control instrument according to claim 1, said electric circuit comprising means to shortcircuit said condenser before the start of the measuring process, a first source of direct current in series with said condenser and said photoelectric cell, means to render said means to shortcircuit inoperable after the start of the measuring process, whereby said condenser accumulates a charge which increases during the measuring process at a rate of speed in accordance with the intensity of the light impinging upon said photoelectric cell, means to indicate when said charge equals a voltage of a predetermined magnitude, including a thyratron with a grid circuit and an anode circuit, said grid circuit comprising a second source of direct current, the positive terminal of said second source connected to the cathode of the thyratron, the negative terminal of said second source connected to the negative terminal of said condenser, and the positive terminal of said condenser connected to the grid of the thyratron, whereby said thyratron is rendered nonconducting before and during the measuring process, but becomes conductive at the end of said process, said anode circuit including a source of alternating current and a relay with an armature and contacts, said armature in series connected with said thyratron and said source of alternating current, and actuated by the anode current of said thyratron at the end of the measuring process, each of said two time-measuring devices comprising a constant speed motor, an electromagnetic clutch, an output shaft, means to keep said clutch deenergized before the measuring process, and means operatively connected to said relay contacts to energize said clutch during and deenergize it at the end of the measuring process, and means urging said shaft to return to its starting position, means maintaining said shaft after the end of the measuring process in its most advanced position against said urging means, and means under control of the operator to render said last named means inoperative for resetting purposes.

14. A print control instrument according to claim 1, including a housing for said photoelectric cell, adapted to be placed on said easel, said housing having an aperture in its top wall, and means to adjust the size of said aperture, whereby the sensitivity of said photoelectric cell to light can be controlled.

15. A print control instrument according to claim 1, including a housing for said photoelectric cell, said housing having an aperture in its top wall, and electromagnetic means to change the size of said aperture, said electric circuit comprising means to shortcircuit said condenser before the start of the measuring process, a source of current in series with said condenser and said photoelectric cell, means to render said means to shortcircuit inoperable after the start of the measuring process, whereby said condenser accumulates a charge which increases during the measuring process at a rate of speed in accordance with the intensity of the light impinging upon said photoelectric cell, means to indicate when said charge equals a voltage of a predetermined magnitude, each of said two time-measuring devices comprising a constant speed motor.

an electromagnetic clutch, an output shaft, means to keep said clutch deenergized before the measuring process, and means operatively connected to said means to indicate to energize said clutch during and deenergize it at the end of the measuring process, and means operatively connected to the output shaft of said second time-measuring device to shortcircuit said condenser at spaced intervals, and means also operatively connected to said shaft to actuate said electromagnetic means to change the size of said aperture between said intervals, said aperture being made progressively larger during successive periods, whereby said second time-measuring device may run several times through its measuring process with progressively larger apertures and proportionately increased light sensitivity, so that a wide range of light intensity values can be measured.

16. A print control instrument according to claim 1, including a housing for said photoelectric cell, said housing having an aperture in its top wall, and electromagnetic means to change the size of said aperture, said electric circuit comprising means to shortcircuit said condenser before the start of the measuring process, a first source of direct current in series with said condenser and said photoelectric cell, means to render said means to shortcircuit inoperable after the start of the measuring process, whereby said condenser accumulates a charge which increases during the measuring process at a rate of speed in accordance with the intensity of the light impinging upon said photoelectric cell, means to indicate when said charge equals a voltage of a predetermined magnitude, including a thyratron with a grid circuit and an anode circuit, said grid circuit comprising a second source of direct current, the positive terminal of said second source connected to the cathode of the thyratron, the negative terminal of said second source connected to the negative terminal of said condenser, and the positive terminal of said condenser connected to the grid of the thyratron, whereby said thyratron is rendered nonconducting before and during the measuring process, but becomes conductive at the end of said process, said anode circuit including a source of alternating current and a relay with an armature and contacts, said armature, in series connection with said thyratron and said source of alternating current, and actuated by the anode current of said thyratron at the end of the measuring process, each of said two time-measuring devices comprising a constant speed motor, an electromagnetic clutch, an output shaft, means to keep said clutch deenergized before the measuring process, and means operatively connected to said relay contacts to energize said clutch during and deenergize it at the end of the measuring process, and means operatively connected to the output shaft of said second time-measuring device to shortcircuit said condenser at spaced intervals, and means also operatively connected to said shaft to actuate said electromagnetic means to change the size of said aperture between said intervals, said aperture made progressively larger during successive periods, whereby said second time-measuring device may run several times through its measuring process with progressively larger apertures and proportionately increased light sensitivity, so that a wide range of light intensity values can be measured.

17. A print control instrument according to claim 1, having a first and a second parallel charging circuit operatively connected to said condenser, said condenser adapted to be charged by them simultaneously, said first charging circuit comprising a first source of voltage and said photoelectric cell, adapted to be placed substantially into the same plane as said sensitized sheet during the actual exposure, said first source of voltage, said photoelectric cell and said condenser connected in series, whereby said condenser, upon exposure of said photoelectric cell to light, is charged with a rate of speed depending upon the intensity of said light, said second charging circuit comprising a second source of voltage and means to limit the current of said second charging circuit to a substantially constant value, said second source of voltage, said means to limit the current, and said condenser connected in series, whereby said condenser is charged with a constant rate of speed, independent of the intensity of said light, said mechanism associated with the output shaft of said first time-measuring device, which converts the rotary travel of said shaft into a movement inversely proportional to the light intensity of the brightest point on the easel, comprising a cam driven by said shaft and a cam-following member, in contact with said cam, said cam having, in its effective portion, a configuration which can be expressed in a system of polar coordinates by the equation $$R = C_1\left(\frac{1}{\frac{1}{C_2\varphi}-1}\right) + C_3$$

where $R$ and $\varphi$ are radius and angle of said system of polar coordinates, respectively, and where $C_1$, $C_2$ and $C_3$ are arbitrary constants.

18. A print control instrument according to claim 1, having a first and a second parallel charging circuit operatively connected to said condenser, said condenser adapted to be charged by them simultaneously, said first charging circuit comprising a first source of voltage and said photoelectric cell, adapted to be placed substantially into the same plane as said sensitized sheet during the actual exposure, said first source of voltage, said photoelectric cell and said condenser connected in series, whereby said condenser, upon exposure of said photoelectric cell to light, is charged with a rate of speed depending upon the intensity of said light, said second charging circuit comprising a second source of voltage and means to limit the current of said second charging circuit to a substantially constant value, said second source of voltage, said means to limit the current, and said condenser connected in series, whereby said condenser is charged with a constant rate of speed, independent of the intensity of said light, said mechanism associated with the output shaft of said first time-measuring device, which converts the rotary travel of said shaft into a movement proportional to the logarithmic value of the light intensity of the brightest point on the easel, comprising a cam driven by said shaft and a cam-following member in contact with said cam, said cam having, in its effective portion, a configuration which can be expressed in a system of polar coordinates by the equation $$R = C_4 + C_5 \log\left(\frac{1}{C_6\varphi}-1\right)$$

where $R$ and $\varphi$ are radius and angle of said system of polar coordinates, respectively, and where $C_4$, $C_5$ and $C_6$ are arbitrary constants.

19. A print control instrument according to claim 1, having a first and a second parallel charging circuit operatively connected to said condenser, said condenser adapted to be charged by them simultaneously, said first charging circuit comprising a first source of voltage and said photoelectric cell, adapted to be placed substantially into the same plane as said sensitized sheet during the actual exposure, said first source of voltage, said photoelectric cell and said condenser connected in series, whereby said condenser, upon exposure of said photoelectric cell to light, is charged with a rate of speed depending upon the intensity of said light, said second charging circuit comprising a second source of voltage and means to limit the current of said second charging circuit to a substantially constant value, said second source of voltage, said means to limit the current, and said condenser connected in series, whereby said condenser is charged with a constant rate of speed, independent of the intensity of said light, said mechanism associated with the output shaft of said second time-measuring device, which converts the rotary travel of said shaft into a movement proportional to the logarithmic value of the light intensity of the darkest point on the easel, comprising a cam driven by said shaft and a cam-following member in contact with said cam, said cam having three effective parts with a changing radius and at least two ineffective parts with a constant radius, effective and ineffective parts arranged in alternating sequence, the three effective parts having configurations following the formulae $$R' = C_7 + C_8 \log\left(\frac{1}{C_9 \varphi} - 1\right)$$

$$R'' = C_{10} + C_{11} \log\left(\frac{1}{C_{12}\varphi} - 1\right)$$

$$R''' = C_{13} + C_{14} \log\left(\frac{1}{C_{15}\varphi} - 1\right)$$

where $R'$, $R''$, $R'''$ and $\varphi$ are radius and angle, respectively, in a system of polar coordinates, and $C_7$, $C_8$, $C_9$, $C_{10}$, $C_{11}$, $C_{12}$, $C_{13}$, $C_{14}$, $C_{15}$ are constants, the maximum value of $R'$ being equal to the minimum value of $R''$ and to the radius of the first ineffective part disposed between the first and second effective parts, the maximum value of $R''$ being equal to the minimum value of $R'''$ and to the radius of the second ineffective part disposed between the second and third effective parts.

20. A print control instrument according to claim 1, said means operatively associated with the output shaft of said first measuring device converting its travel into a movement proportional to the logarithmic value of the light intensity of the brightest point on the easel comprising a first cam driven by said output shaft and a first cam-following roller, said means operatively associated with the output shaft of said second measuring device converting its travel into a movement proportional to the logarithmic value of the light intensity of the darkest point on the easel comprising a second cam driven by said output shaft and a second cam-following roller, said mechanism indicating the difference of said two logarithmic light intensities comprising a first pivoted lever with a stationary pivot, a second pivoted lever carrying said two cam-following rollers, the pivot of said second lever supported by said first lever and located between the centers of said rollers on a straight line connecting said centers, and a pointer carried by said first lever, adapted to indicate contrast, whereby an equal change of the two light intensities merely causes a rotation of said second lever without moving said first lever, but whereby an unequal change of said two light intensities causes said second lever to assume a new position in accordance with the contrast between the brightest and the darkest point on the easel.

ALFRED SIMMON.